United States Patent [19]
Uehara

[11] Patent Number: 5,137,144
[45] Date of Patent: Aug. 11, 1992

[54] CONVEYOR SYSTEM

[76] Inventor: Akira Uehara, 1-19-18 Nishi-Tsutsujigaoka, Chofu-shi, Tokyo, 182, Japan

[21] Appl. No.: 585,986

[22] Filed: Sep. 21, 1990

[30] Foreign Application Priority Data

Sep. 22, 1989 [JP] Japan .................. 1-247286
Apr. 5, 1990 [JP] Japan .................. 2-91034

[51] Int. Cl.$^5$ ............................................. B65G 17/10
[52] U.S. Cl. ................................ 198/822; 198/851; 198/698
[58] Field of Search .............. 198/822, 851, 853, 698

[56] References Cited

U.S. PATENT DOCUMENTS

| | | | |
|---|---|---|---|
| 2,989,169 | 6/1961 | Clapp et al. | 198/822 |
| 3,214,008 | 10/1965 | Warrick | 198/822 X |
| 3,243,035 | 3/1966 | Ratkowski | 198/822 |
| 3,970,190 | 7/1979 | Kovats | 198/822 |
| 4,155,444 | 5/1979 | Kovats | 198/853 X |
| 4,582,193 | 4/1986 | Larsson | 198/853 X |
| 4,840,269 | 6/1989 | Anderson | 198/822 |
| 4,925,013 | 5/1990 | Lapeyre | 198/698 |
| 4,993,543 | 2/1991 | Lapeyre | 198/853 X |

FOREIGN PATENT DOCUMENTS

| | | | |
|---|---|---|---|
| 532273 | 10/1954 | Belgium | 198/822 |
| 61-66409 | 7/1986 | Japan . | |
| 61-166413 | 7/1986 | Japan . | |
| 0082207 | 4/1988 | Japan | 198/822 |
| 0609682 | 5/1978 | U.S.S.R. | 198/822 |
| 797118 | 6/1958 | United Kingdom | 198/822 |

Primary Examiner—D. Glenn Dayoan
Attorney, Agent, or Firm—Sandler, Greenblum & Bernstein

[57] ABSTRACT

A conveyor system having conveyor pieces connected together, without gaps, and links having projections engageable with sprockets connected in an endless manner to thereby constitute an endless conveyor. The arrangement permits powdery goods or fluid goods to be conveyed without falling or spilling from the link portions of the loading surface of the endless conveyor. A plurality of side protect fins are placed one on another without gaps on the sides of the endless conveyor in its width direction. This allows powdery goods or fluid goods to be conveyed without falling or spilling from the overlapping portions of the side protect fins at the sides of the loading surface.

26 Claims, 15 Drawing Sheets

CONVEYOR SYSTEM

BACKGROUND OF THE INVENTION

1. Field of the Invention

The present invention relates to a conveyor system, and, more particularly, to a conveyor system in which conveyor pieces constituting an endless conveyor are connected together without seams, and links with projections which are engageable with sprockets, continuously linked to be able to cope with the endless running path of the conveyor thereby to permit the sprockets to engage directly with the resulting endless conveyor for its rotational running, and which is designed in such a way that, even when goods to be conveyed (hereinafter referred to simply as conveyed goods), such as powdery goods or fluid goods, are directly loaded on the loading surface of the endless conveyor, they can be conveyed without dropping or falling off of the loading surface and, further, in which slack in the lower or return run of the conveyor can be prevented.

2. Description of the Related Art

Conventional conveyor systems have an endless chain placed around front and rear sprockets, a plurality of supports with a rectangular cross section attached in parallel to the chain, with gaps provided between the adjoining supports, thereby to ensure smooth circular running at the front and rear sprocket portions.

Although the conventional conveyor systems with the above structure are suitable for conveying shape-retaining goods, such as corrugated fiberboard boxes or bags, they are not particularly suitable for transferring goods, such as powdery goods or fluid goods, which are likely to fall off or drop from between the supports. Conventionally, therefore, a separate conveyor system is required for such goods, resulting in low work efficiency.

As a solution to this shortcoming, conveyors as disclosed in Published Unexamined Japanese Patent Application Nos. 61-166409 and 61-166413 have been proposed. The conveyors have a plurality of goods supports extending sideways attached with proper intervals therebetween to a chain extending over a pair of front and rear sprockets, shield members provided in the gaps between the supports, and guide plates disposed directly above, and between the sides of, the planes of the supports. This arrangement is said to permit conveyance of powdery goods as well as shape-retaining goods.

According to the inventions disclosed in the Japanese publications, however, the lower end of the guide plate directly above and between the sides of the plane of each support is separated from the support plane, forming a gap thereat. Therefore, powdery goods or fluid goods are apt to fall or leak outside from the gap.

It is practically impossible to make the lower end of the guide plate contact the support plane for elimination of the gap because the corners of the front and rear ends of the adjoining supports in the running direction hit each other when the supports begin the circular running portions of the endless path of the conveyor at the front and rear sprocket portions.

SUMMARY OF THE INVENTION

It is therefore an object of the present invention to overcome the above conventional problems and provide a conveyor system which is designed in such a way that, even when conveyed goods, such as powdery goods or fluid goods, are directly loaded on an endless conveyor, the goods do not drop from the loading surface of the conveyor pieces and can be conveyed without falling off the sides of the conveyor pieces.

In accordance with the above object, the first feature of the present invention lies in that in a conveyor system, an endless conveyor, placed around a pair of sprockets provided at front and end portions of a guide rail assembly and having a loading surface for conveyed goods, comprises a plurality of conveyor pieces, links running along a guide rail and projections engageable with the sprockets, each of the conveyor pieces having concave and convex faces at front and rear end portions in a running direction thereof, the links disposed under the conveyor pieces and having position aligning walls adapted to abut on end faces of the conveyor pieces for attachment to the conveyor pieces, and each of the links having link portions provided at a front and rear in a running direction thereof and a projection provided at a bottom to be engageable with the sprockets, the conveyor pieces being placed one on another so that the concave and convex faces of each of the conveyor pieces are engageable with the convex and concave faces of adjoining conveyor pieces.

The second feature of the present invention lies in that in the conveyor system having the first feature, the links are attached to end portions of the conveyor pieces in a side lengthwise direction thereof and side protect fins are provided on outer surfaces of the links, separate therefrom or integral therewith, and inclined in such a manner as to be open toward one end portion of a running direction.

The third feature of the present invention lies in that in the conveyor system having the first or second feature, the link portions of the links each have a projecting portion formed at one end and a recess portion formed at the other end, the projecting portion of each of the link portions is fitted to the recess portion of the link portion of an adjoining one of the links while the recess portion is fitted to the projecting portion of the link portion of another adjoining one of the links, and the link portions are rotatable by means of coupling shafts.

The fourth feature of the present invention lies in that in the conveyor system having the first or second feature, links each have a side protect fin attaching portion provided on an outer end face and convex and concave faces respectively formed at the front and rear of the side protect fin attaching portion in such a way that when the links are connected to one another, the convex face engages with the concave face of an adjoining one of the side protect fin attaching portions and the concave face engages with the convex face of another adjoining one of the side protect fin attaching portions.

The fifth feature of the present invention lies in that in the conveyor system having the first or second feature, an engaging slide member is provided on a side of the sprocket engaging projection of each of the links and a rail edge is formed on the guide rail assembly for engagement with the engaging slide member.

The sixth feature of the present invention lies in that the conveyor system having the first or second feature, the links are attached to right and left end portions of the conveyor pieces, side protect fins are provided on outer end faces of the links, separate therefrom or integral therewith, and inclined in such a manner as to be open toward one end portion of a running direction, and that a face of each of the side protect fins which faces a head of a coupling shaft to be fitted in a hole of an associated one of the link portions of the links is made a blind covering without a through hole of the coupling shaft.

The seventh feature of the present invention lies in that in the conveyor system having the first or second feature, auxiliary links are disposed between side ends of the endless conveyor in a width direction thereof and have engage receiving portions engaged with engage claws of the conveyor pieces, auxiliary link receiving members are provided on a support member of the guide rail assembly, and both sides of the auxiliary links are positioned to be stationary by interval holding members.

The eighth feature of the present invention lies in that in the conveyor system having the first or second feature, a longitudinal recess is formed in an inner surface of each of the side protect fins and a partition having a side portion which can be fitted in the recess is formed on each of the conveyor pieces.

The ninth feature of the present invention lies in that in the conveyor system having the first or second feature, an engaging slide member is a roller attached to a shaft of each of the links.

The tenth feature of the present invention lies in that in the conveyor system having the first or second feature, a projection is formed at one of the front and rear of each of the link portions, and a tie recess is formed at the other side.

The eleventh feature of the present invention lies in that in the conveyor system having the first or second feature, a buffer made of a flexible material is provided on a flat face of each of the conveyor pieces.

The twelve feature of the present invention lies in that in the conveyor system having the first or second feature, a partition is formed on a flat face of each of the conveyor pieces integrally or separately and stands upright in a recess shape.

The thirteenth feature of the present invention lies in that in the conveyor system having the first or second feature, shaft members are provided at predetermined intervals on outer surfaces of the links and a limit switch is provided on a side of the guide rail, whereby when the shaft members reach the limit switch, an ON/OFF switching action of the limit switch is conducted.

The fourteenth feature of the present invention lies in that in the conveyor system having the first or second feature, a sprocket engage chain comprising a link piece, a bush and a coupling shaft is provided along and on each of the links.

BRIEF DESCRIPTION OF THE DRAWINGS

In the detailed description of preferred embodiments of the present invention presented below, reference is made to the accompanying drawings of which.

DETAILED DESCRIPTION OF THE PREFERRED EMBODIMENTS

Figure 1:
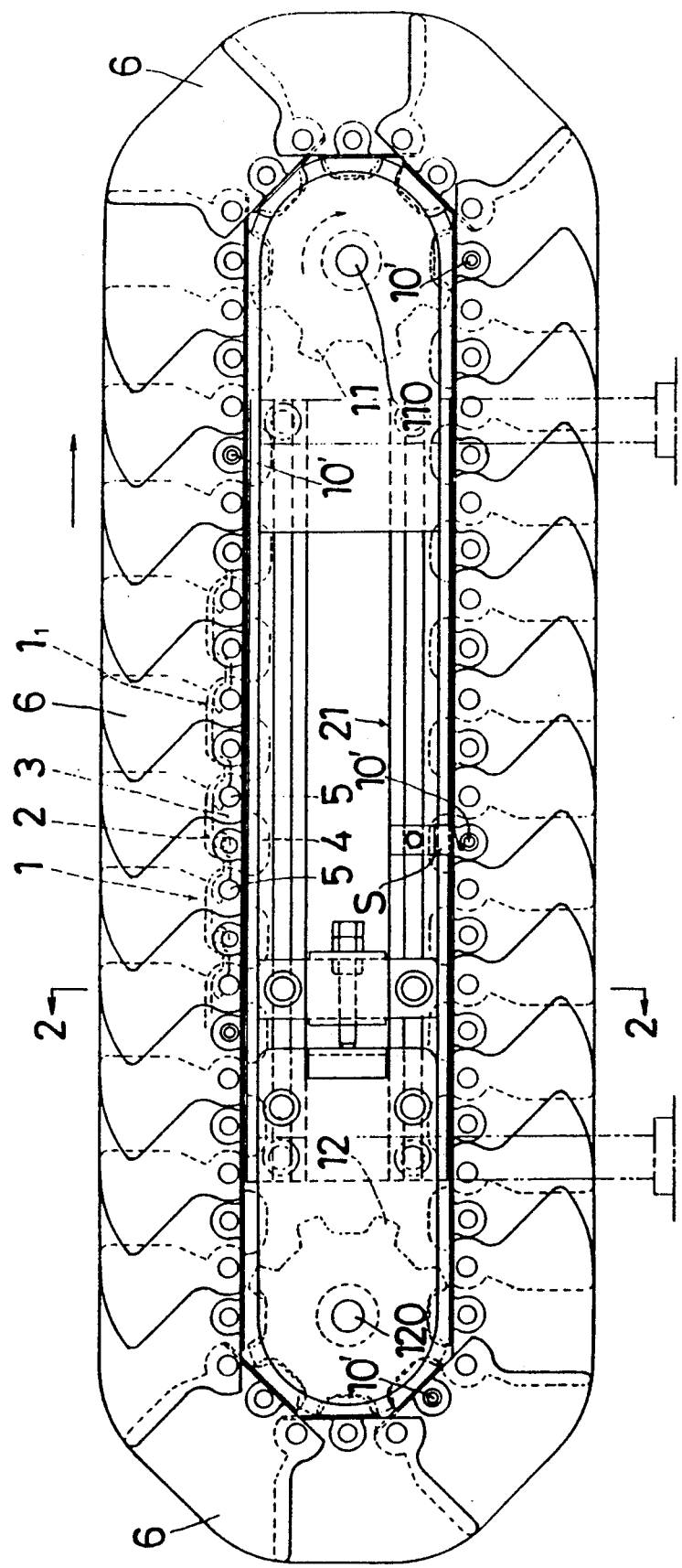
FIG. 1 is a general front view of a conveyor system according to the present invention.
Figure 2:
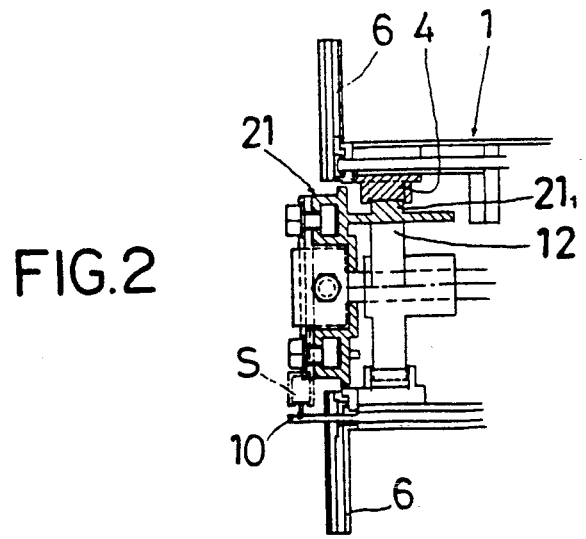
FIG. 2 is a cross section taken along the line 2—2 in FIG. 1.
Figure 3:
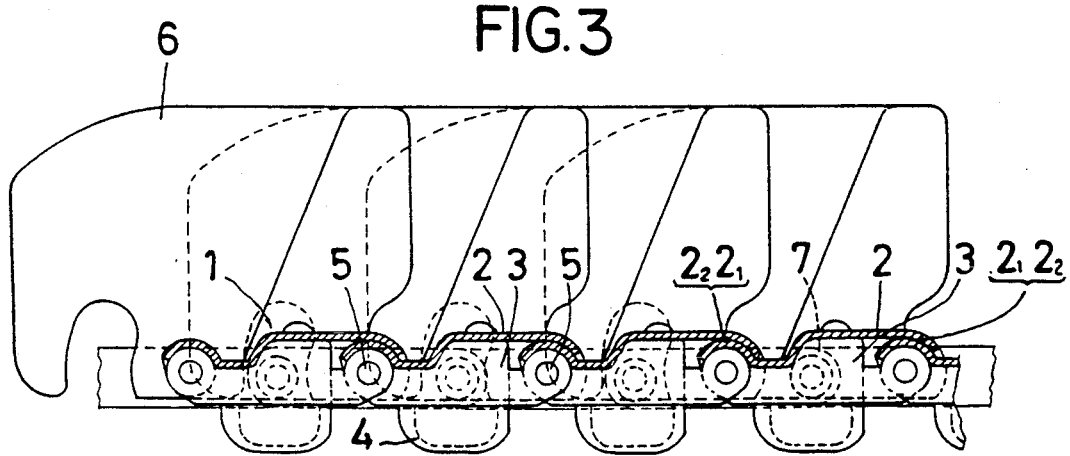
FIG. 3 is a cross section taken along the line 3—3 in FIG. 4, illustrating plate-shaped conveyor pieces.
Figure 4:
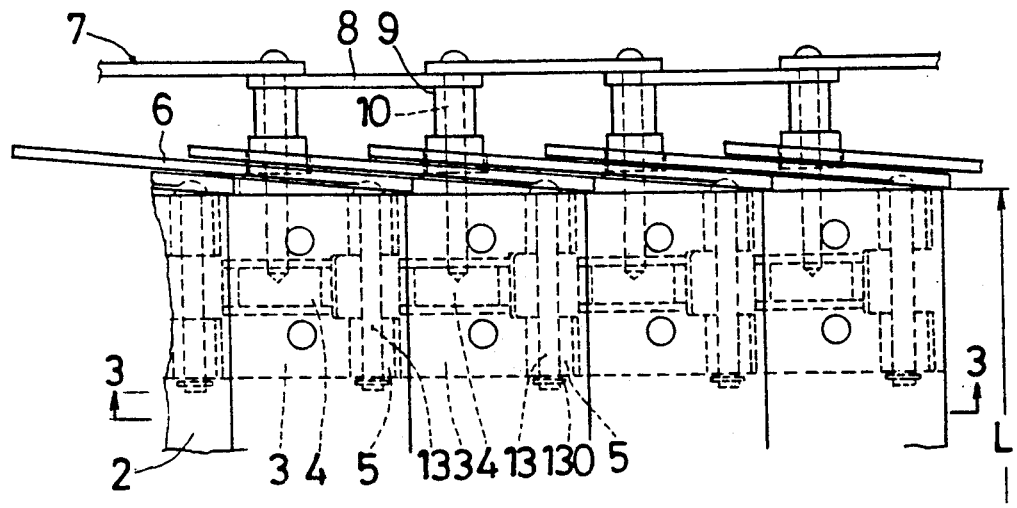
FIG. 4 is a plan view of part of FIG. 3.
Figure 5:
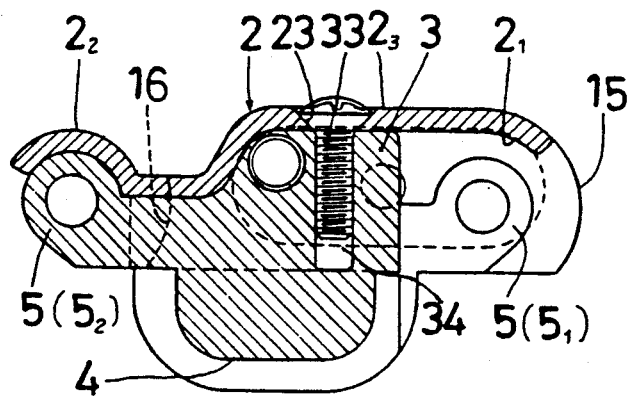
FIG. 5 is a cross section taken along the line 5—5 in FIG. 6, illustrating how a plate-shaped conveyor piece is attached to a link.
Figure 6:
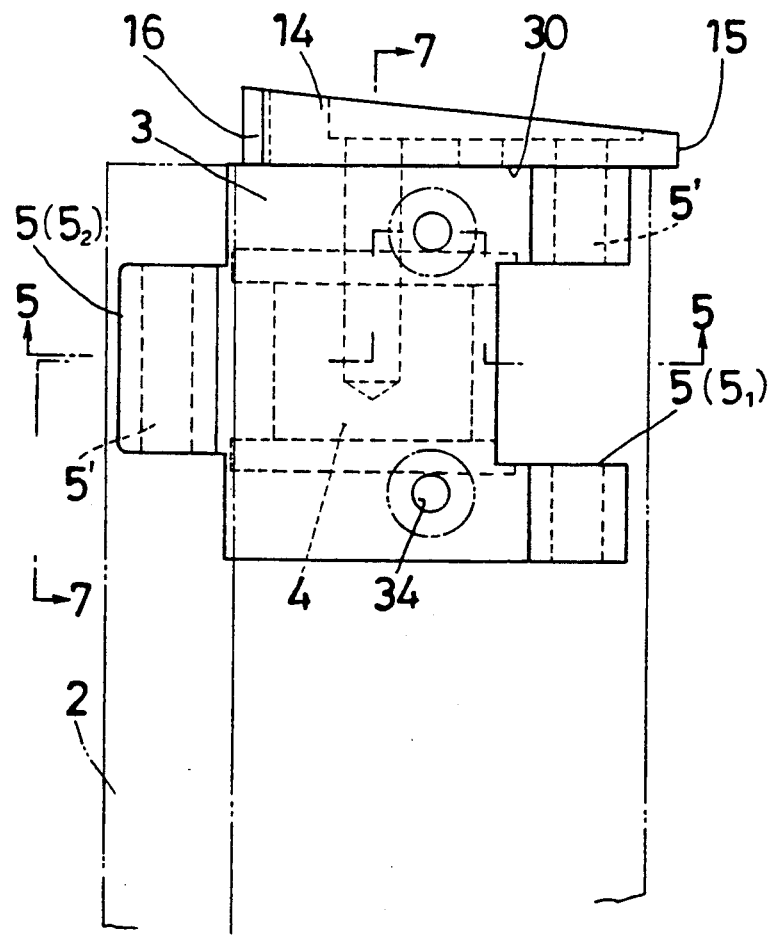
FIG. 6 is a plan view of the link in FIG. 5 with the conveyor piece removed.
Figure 7:
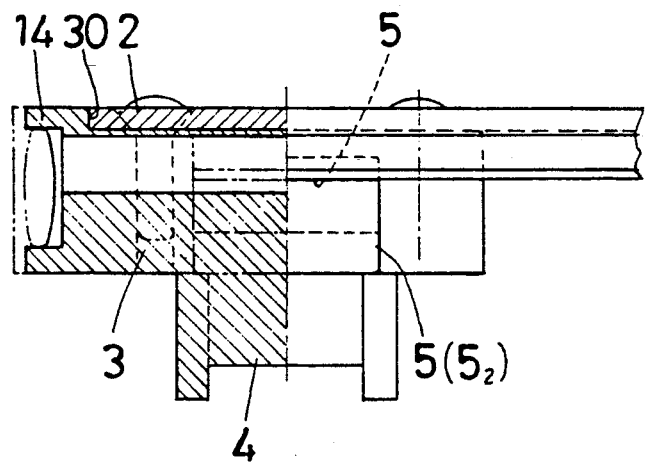
FIG. 7 is a cross section taken along the line 7—7 in FIG. 6.

Preferred embodiments of the present invention will now be described with reference to the accompanying drawings.

Referring to the diagrams, reference numeral "1" denotes an endless conveyor which extends around sprockets at the front and the rear ends of a guide rail, and has a loading surface $1_1$ for conveyed goods.

Reference numeral "2" denotes conveyor pieces that constitute the endless conveyor 1. The length L of each conveyor piece can be set to an arbitrary length according to the need. FIGS. 3 to 7 illustrate conveyor pieces made of metal, such as stainless steel or aluminum, which have holes 23 formed therein and are fixed to links 3 by bolts 33 through the holes 23.

Figure 12:
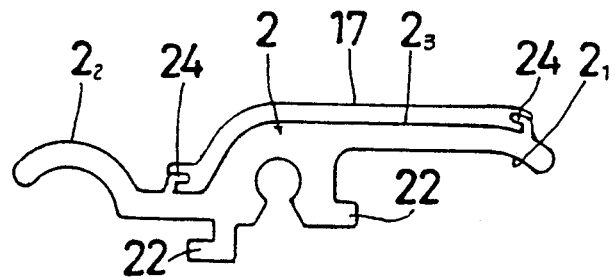
FIG. 12 is a front view showing another embodiment of a conveyor piece.
Figure 13:
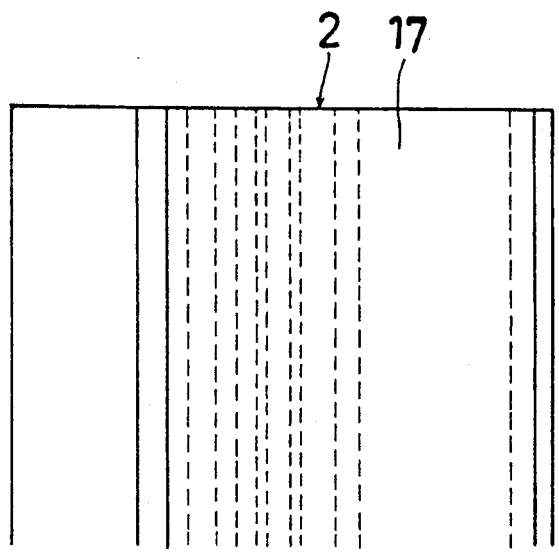
FIG. 13 is a plan view of FIG. 11.

In FIGS. 12 and 13, the conveyor pieces are each formed by coupling a extrusion-molded stainless member 17 and a synthetic resin member. Engaging claws 22 are provided at the bottom of the resultant structure.

Figure 14:
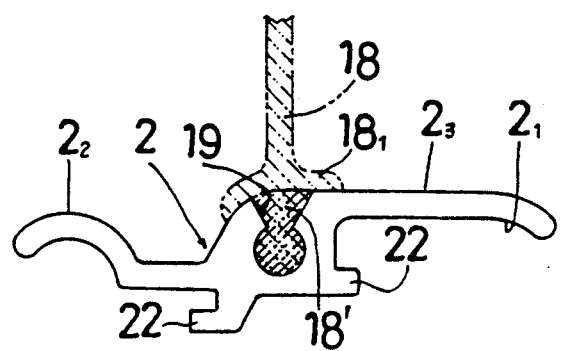
FIG. 14 is a front view illustrating another embodiment of a conveyor piece.
Figure 15:
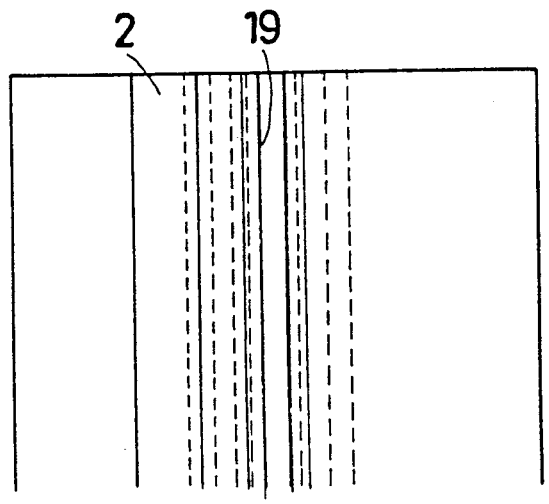
FIG. 15 is a plan view of FIG. 14.
Figure 16:
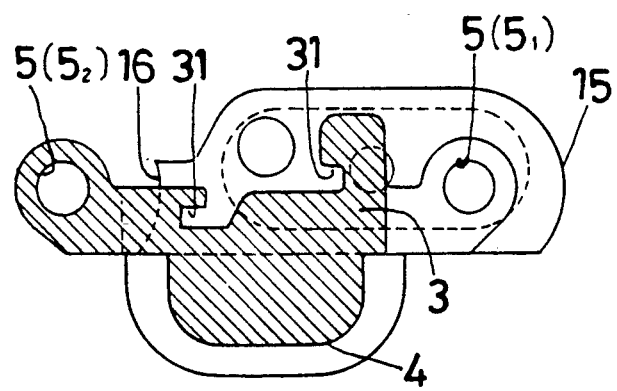
FIG. 16 is a center longitudinal cross section of a link to which the conveyor pieces shown in FIGS. 12-15 are adapted to be attached.
Figure 17:
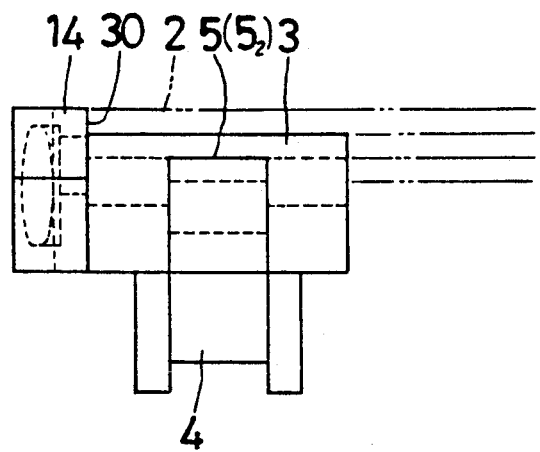
FIG. 17 is a right side view of FIG. 16.
Figure 18:
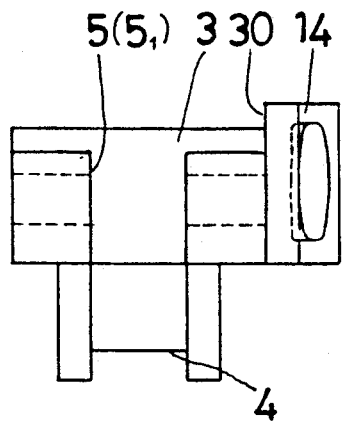
FIG. 18 is a left side view of FIG. 16.
Figure 19:
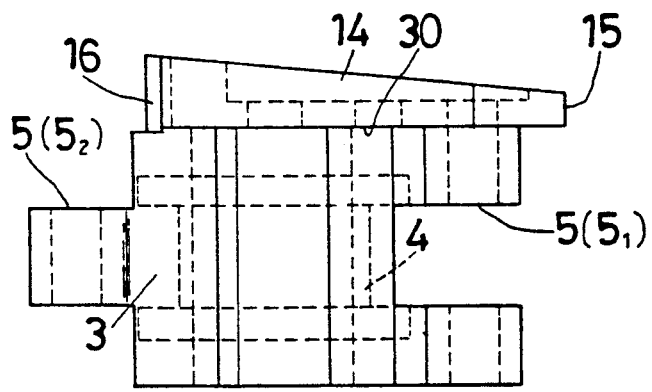
FIG. 19 is a plan view of FIG. 16.
Figure 20:
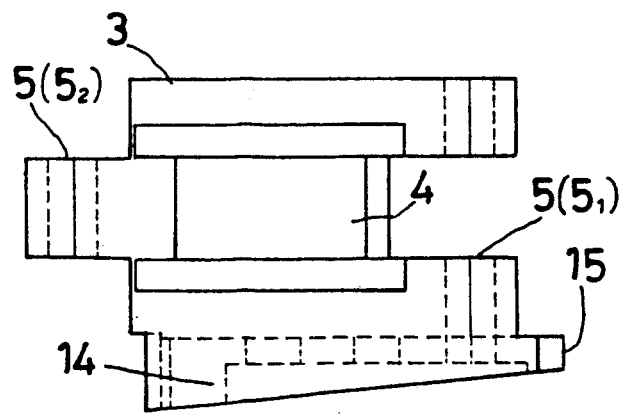
FIG. 20 is a bottom view of FIG. 16.

In FIGS. 14 and 15, the conveyor pieces are each made of only a synthetic resin, and have engaging claws 22 formed at the bottom thereof.

Each of the conveyor pieces has a concave face $2_1$ formed at the front end in a running direction, and a convex face $2_2$ formed at the rear end. When each conveyor piece is connected to an adjacent link, the concave face $2_1$ of that conveyor piece is smoothly fitted to the convex face $2_2$ of the forward piece and the convex $2_2$ is smoothly fitted in the concave face $2_1$ of the rear conveyor piece.

Figure 24:
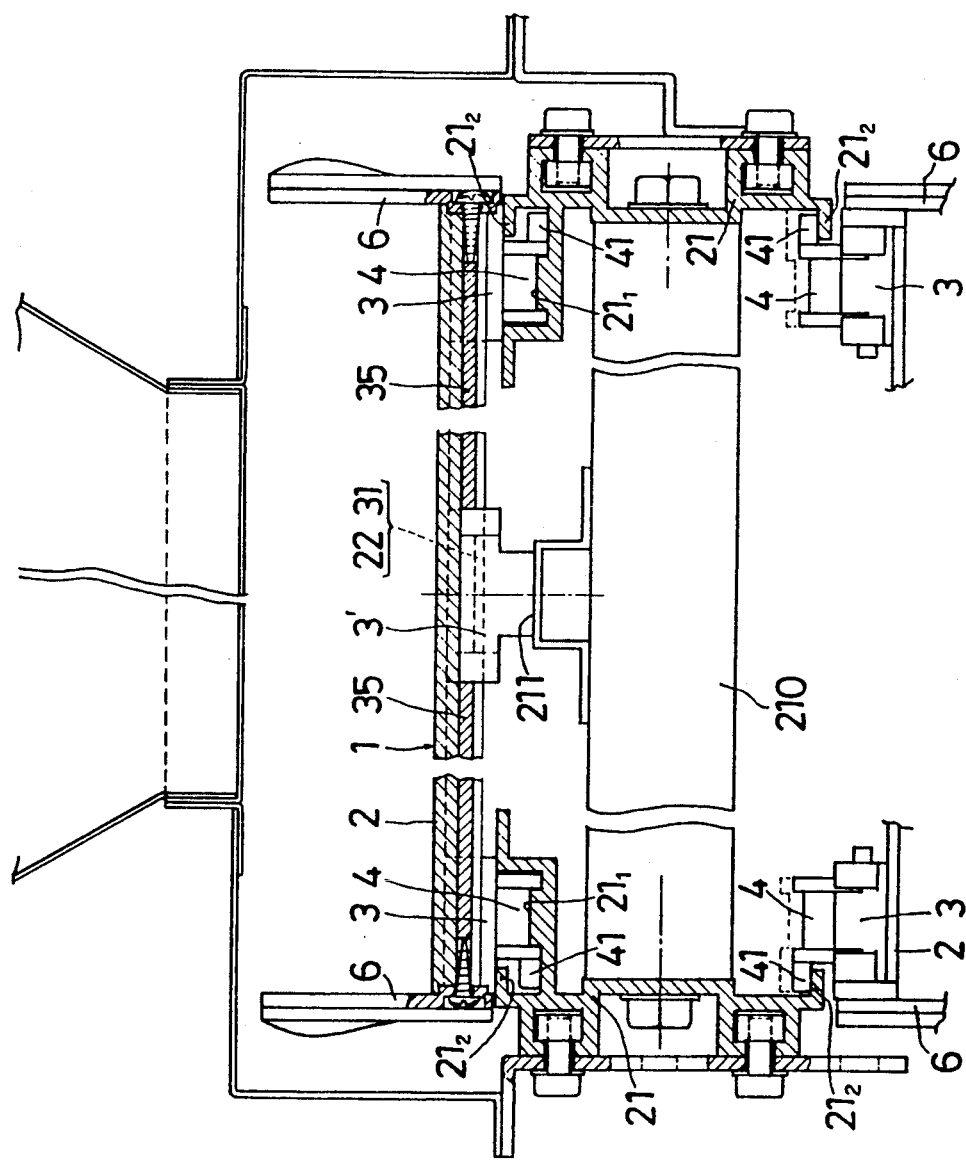
FIG. 24 is an enlarged cross-sectional view of part of the center portion of the conveyor system in FIG. 1.
Figure 25:
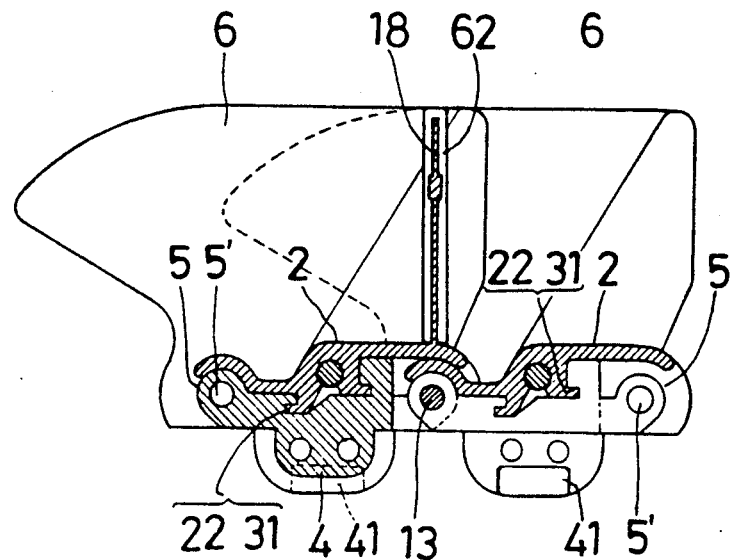
FIG. 25 is a longitudinal cross-sectional view of the conveyor pieces and side protect fins in the arrow direction.
Figure 26:
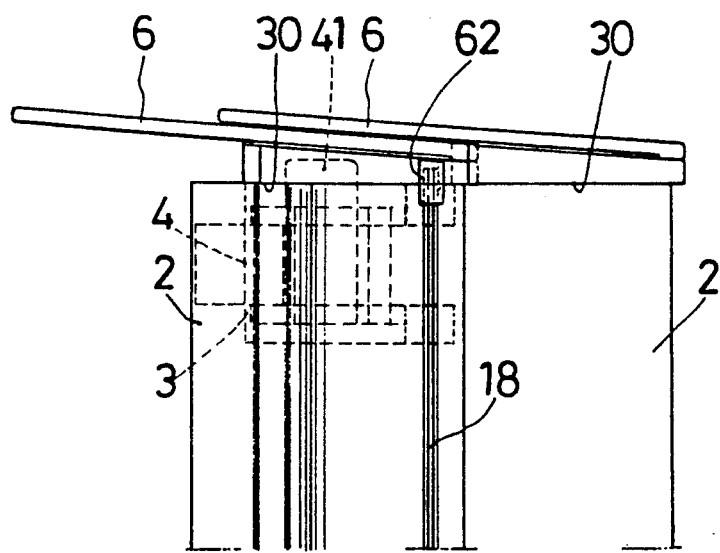
FIG. 26 is a plan view of part of FIG. 25.

Reference numeral "3" denotes links which are attached to the side ends of the conveyor pieces in the width direction, as shown in FIG. 24, for example. The links 3 are fastened to the associated conveyor pieces by the bolts 33 driven through the holes 23 and fastened into screw holes 34 of the links 3 when the conveyor pieces are metal plates, while with the conveyor pieces being extrusion-molded metal products or synthetic resin products, engage receiving portions 31 are formed and engage claws 22 of each link are engaged with the engage receiving portions 31 to secure the conveyor pieces 2 to the links 3. A side protect fin attaching portion 14 having a positioning wall 30 formed on one end thereof is formed integrally on one outer end face of each link.

Each link 3 has a recessed side protect fin attaching portion 14 formed on the outer end face thereof and has a convex face 15 and a concave face 16 formed at the front and rear end thereof.

Reference numeral "3'" denotes an auxiliary link. A single auxiliary link or a plurality of the auxiliary links are arranged between the links 3 located on both ends in the width direction, as shown in FIG. 24, for example. The engage receiving portions 31 are fitted in the engage claws 22 and are positioned and fixed by interval holding members 35. The auxiliary links are designed to slide on receive members 211 which are provided on supporting members 210 of the guide rail.

Reference numeral "4" denotes projections to engage with the claws of the sprockets. According to the illustrated example, the projections are formed integrally on the bottom of the links 3, and engaging slide members 41 are provided on the side or at the vicinity of the projections 4.

Figure 23:
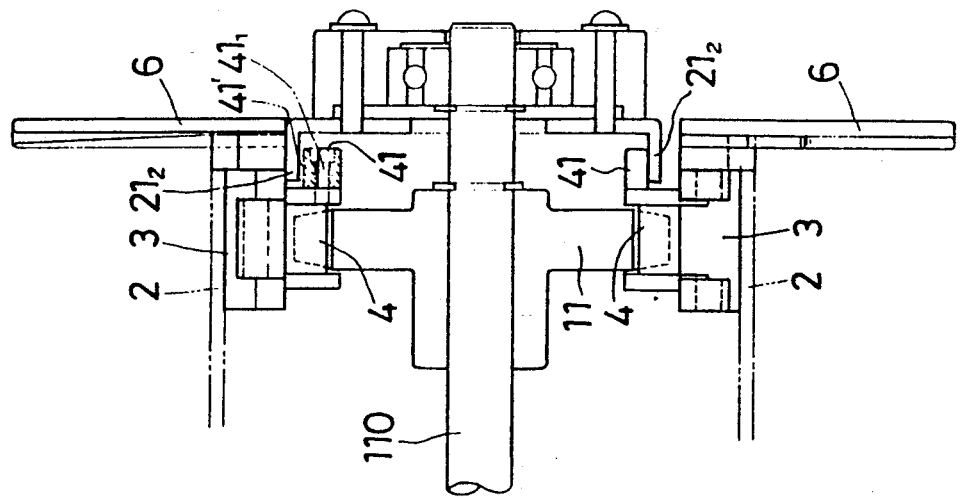
FIG. 23 is a cross section taken along the line 23—23 in FIG. 22.

The engaging slide members may be modified to be rollers 41' as shown in FIGS. 23 and 24, which are adapted to be attached to shafts $41_1$ on the projection side.

Figure 27:
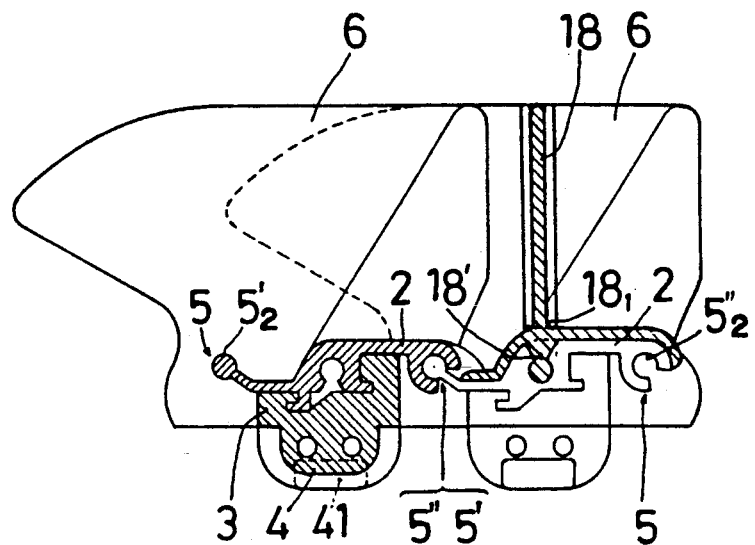
FIG. 27 is a longitudinal cross-sectional view of another example of FIG. 25 in the arrow direction.

Reference numeral "5" denotes link portions provided at the front and rear ends of the link 3. A recess portion $5_1$ having a link hole 5' is formed at the front end and a projecting portion $5_2$ formed at the rear end. The recess portion $5_1$ and the projecting portion $5_2$ are connected by a coupling shaft 13. As shown in FIG. 27, a projection $5_1'$ is formed on one of the front and rear link portions 5 of the link 3, and a tie recess $5_2''$ is formed in the other link portion, the projection and the recess being respectively engaged with the recess portion $5_2''$ of an adjoining link and the projection $5_1'$ of another adjoining link.

Figure 8:
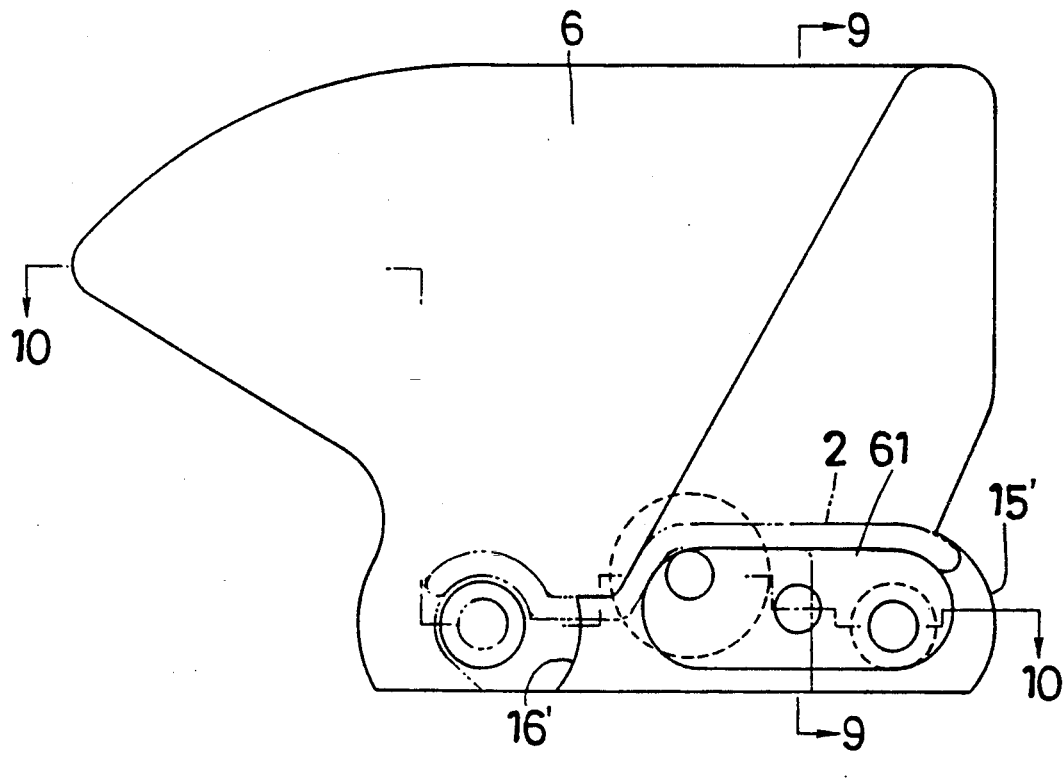
FIG. 8 is a front view of a side protect fin.
Figure 9:
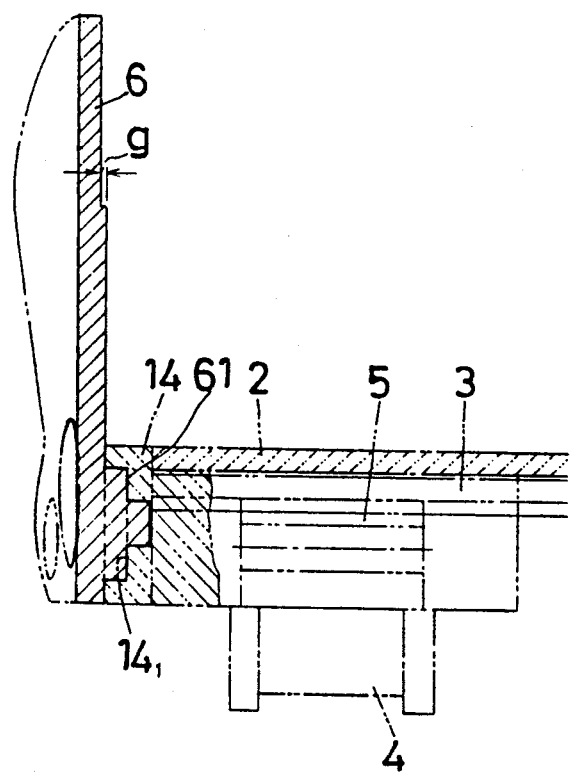
FIG. 9 is a cross section taken along the line 9—9 in FIG. 8.
Figure 10:
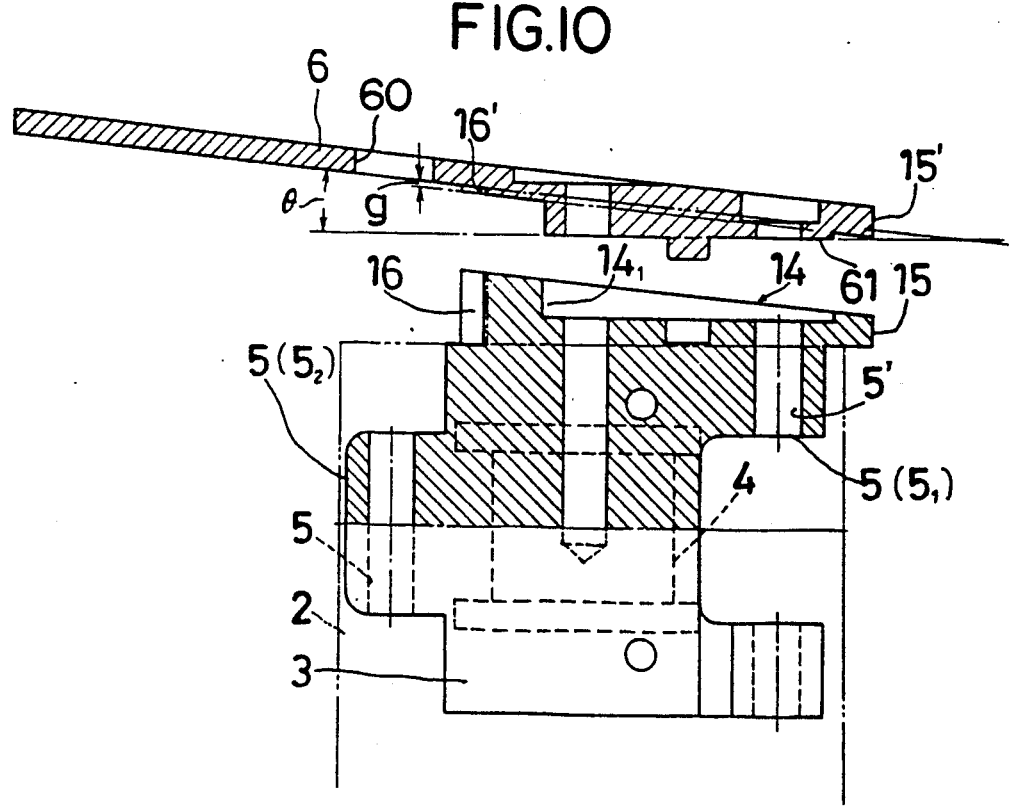
FIG. 10 is a cross section taken along the line 10—10 in FIG. 8, illustrating a side protect fin for the link.

Reference numeral "6" denotes side protect fins. As shown in FIGS. 8 through 10, each side protect fin has an attaching protruding portion 61 formed at the bottom for the associated link 3 and a convex face 15' and a concave face 16', which match with the convex face 15 and concave face 16 of the link.

Figure 11:
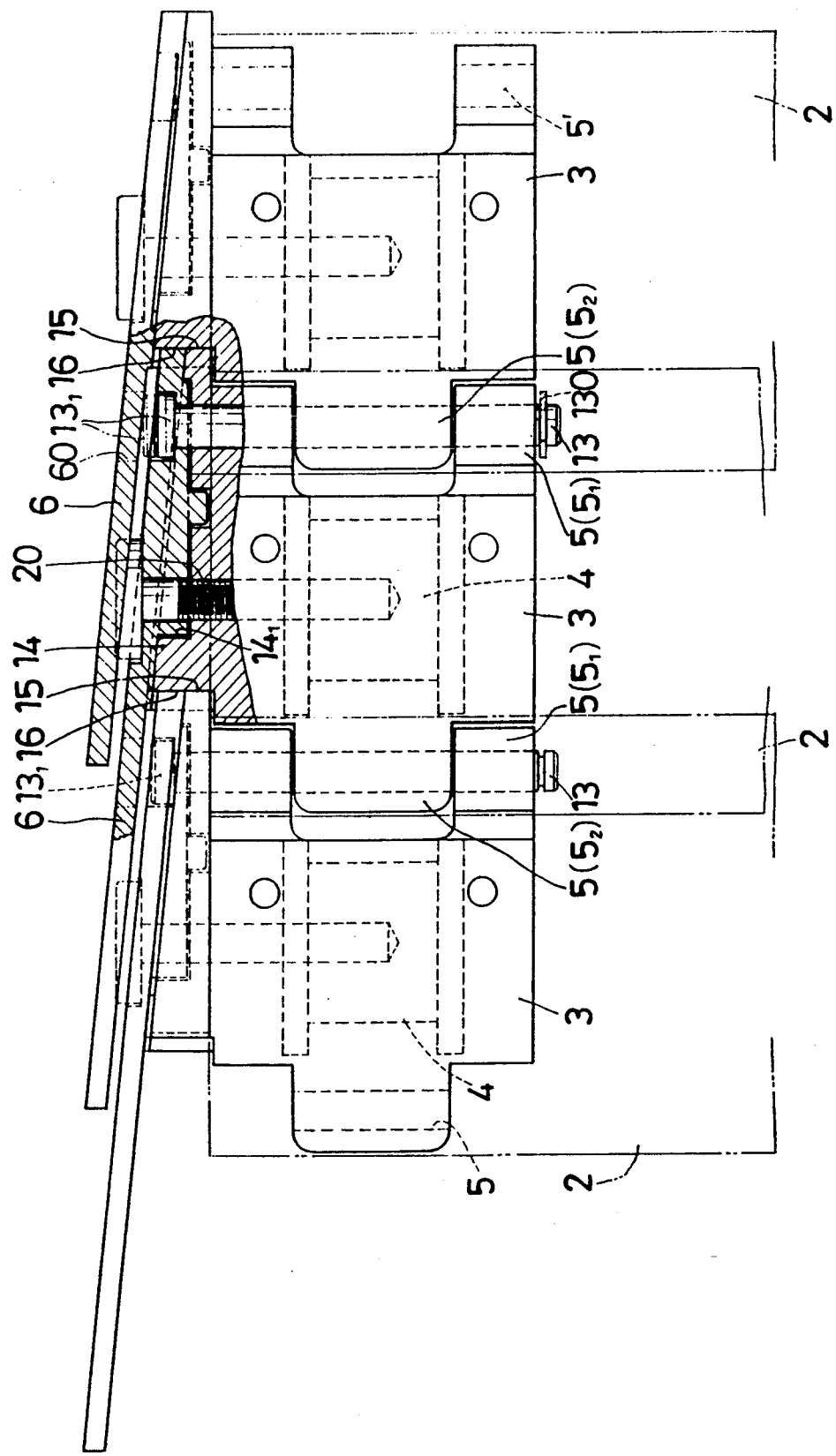
FIG. 11 is a plan view illustrating linkage of the links each having the side protect fin in FIG. 10 attached thereto.

The side protect fin 6 in FIGS. 8 to 10 has a hole 60 formed through which the coupling shaft 13 for connecting the links 3 is fitted. This hole may be omitted, however, and that portion may be made a blind covering, as shown in FIG. 11, so that when a plurality of side protect fins are sequentially placed one on another, the drive-out movement of the head $13_1$ of the coupling shaft 13 is restricted by the next protect fin, thus eliminating the need for a drive-out stopping clip 130 at the tip of the coupling shaft 13.

The side protect fins 6 are tilted at an inclination angle of $\theta$ (about 5 degrees in FIG. 10), outward to the rear portion of the advancing direction with respect to the attaching portions 14.

Each side protect fin has a step formed at the mid way of the running direction, so that when the side protect fins are placed one on another, a small gap g of about 0.2 to 0.5 mm is provided.

The side protect fins 6 may be formed integral with the links 3 or separate therefrom. It is desirable, however, that those side protect fins at the vicinity of where the belt-shaped conveyors are linked to be endless are of a separate type while the other side protect fins be of integral type.

FIGS. 5 to 7 and 16 to 18 illustrate a case where the side protect fins 6 are not attached to the links, and the loading surface of the endless conveyor 1 is flat in the lateral width direction, so that they can be utilized for conveying such powdery goods which hardly overflow in the lateral width direction.

If the conveyed goods on the endless conveyor 1 are solid shape-retaining goods, these goods even sticking out can be conveyed.

Reference numeral "7" are sprocket engaging chains disposed along the outer surfaces of the links 3. Each chain 7 comprises a link piece 8, a bush 9 and a coupling shaft 10 and is attached to the associated link 3 by means of this coupling shaft.

Reference numeral "10'" denotes shaft members protrusively provided on the outer ends of the links 3 with predetermined intervals therebetween. When the shaft members 10' come in contact with a limit switch S provided on a sprocket support frame, the activation and deactivation of the endless conveyor are switched.

Figure 21:
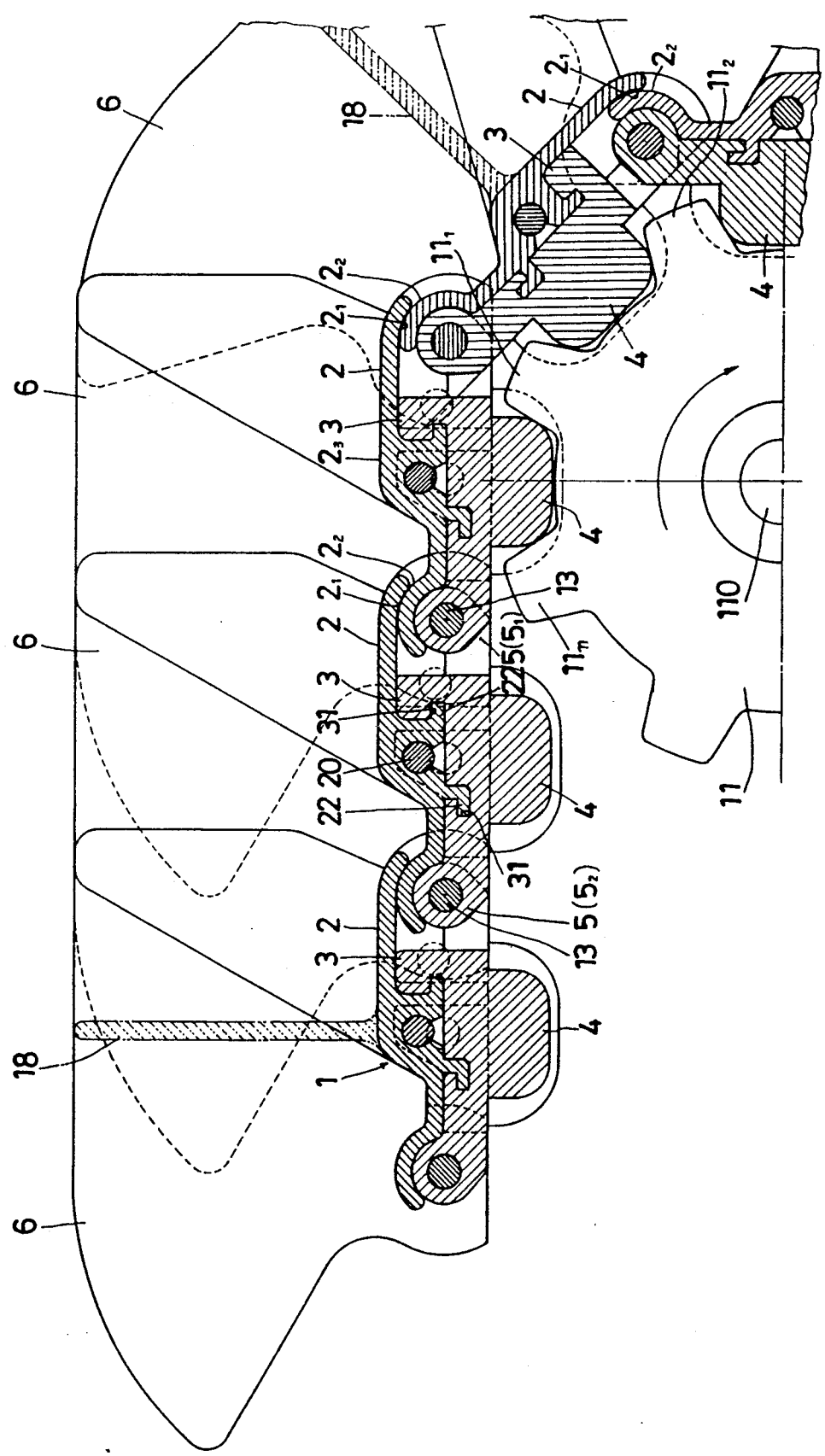
FIG. 21 is a center longitudinal cross-sectional view illustrating the linkage of links in FIG. 16 attached with conveyor pieces in FIG. 12 and then with side protect fins.
Figure 22:
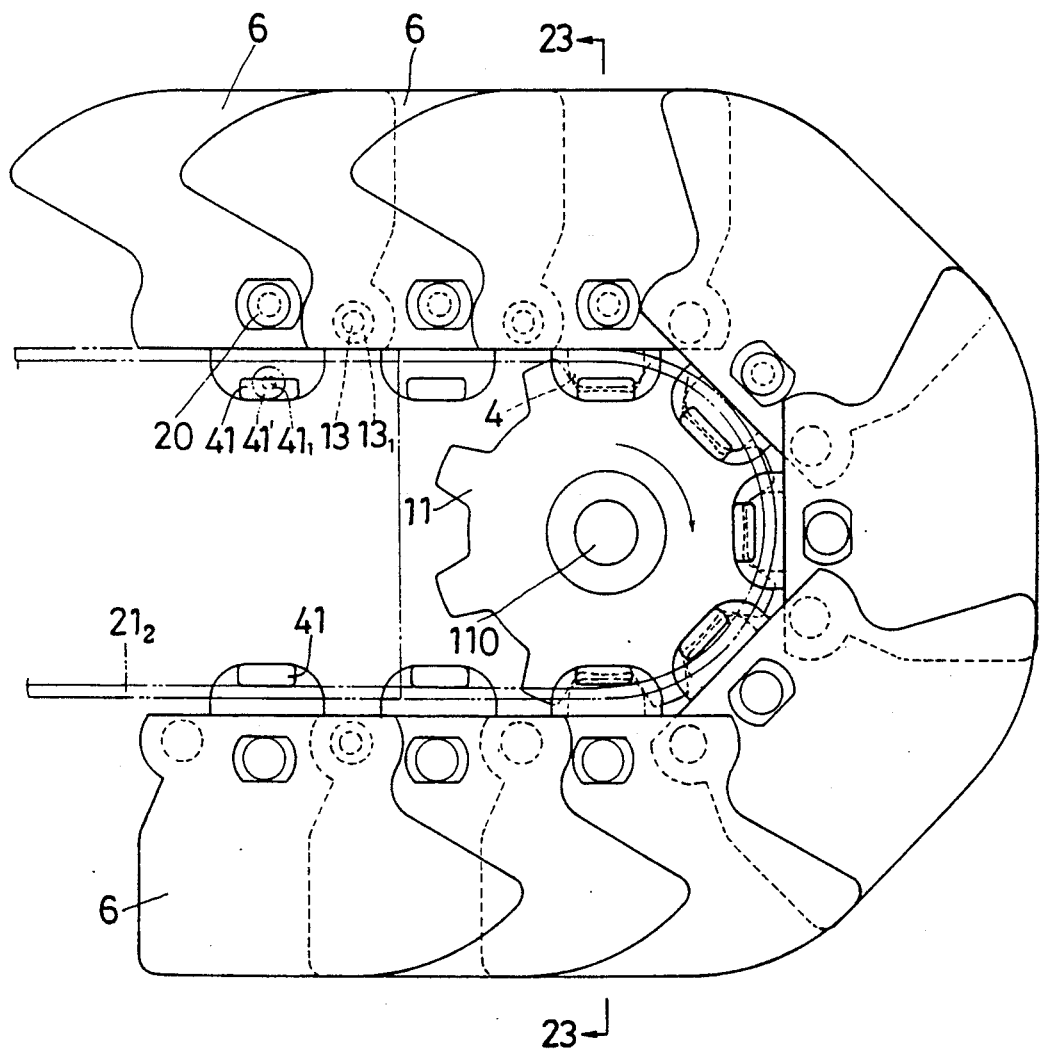
FIG. 22 is an enlarged front view of one end of the conveyor system shown in FIG. 1.

Reference numerals "11" and "12" are sprockets provided with a given interval at the front and rear of the guide rail. Referring to FIG. 21, the projections 4 of the endless conveyor 1 are engaged with teeth $11_1$, $11_2$, ..., $11_n$ of the front sprocket. One of the sprockets, 11, has a shaft 110 (or 120) connected to a drive motor. In this case, it is desirable that the drive motor be coupled to the shaft of the front sprocket as viewed in the running direction.

Reference numeral "14" denotes side protect fin attaching portions provided at the outer end faces of the links 3. Each attaching portion 14 has a recess $14_1$ formed in which the protruding portion 61 of the associated side protect fin is fitted, with the convex face 15 and the concave face 16 formed at the front and rear portion of the attaching portion.

In FIGS. 12 and 13, reference numeral "17" denotes a mat-shaped buffer attached via engaging claws 24 to the flat surface of the conveyor piece 2. This buffer is made of a strong and flexible material. It is preferable that the buffer is made of a synthetic resin or synthetic rubber. This buffer is used in a case where the conveyor pieces are made of metal which may undesirably damage the conveyed goods, or where the loading surface is slippery which may undesirably shift the conveyed goods. The buffer is designed to cover the entire flat surface of the conveyor piece.

Figure 28:
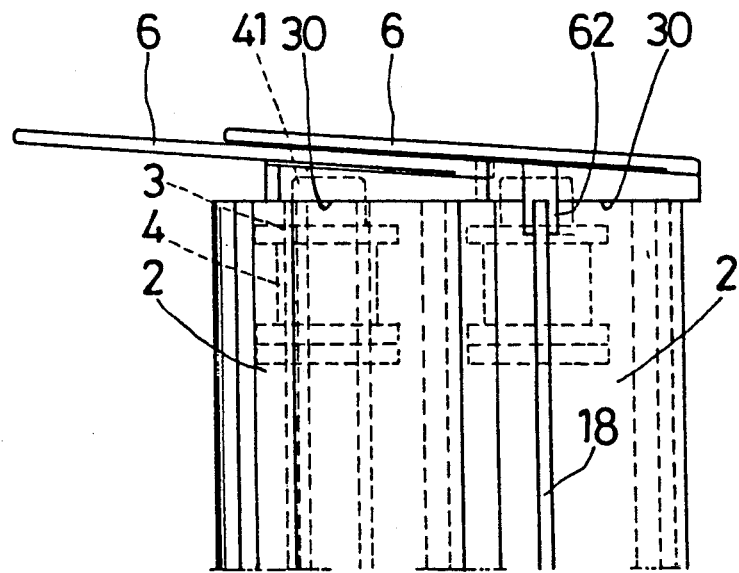
FIG. 28 is a plan view of part of FIG. 27.

In FIGS. 14 and 21, reference numeral "18" is a partition which may be provided separate from the conveyor piece 2 with its base portion $18_1$ fitted from the lateral direction into the recess 19 formed in the flat surface of the conveyor piece 2 so that the partition can be set upright, or which may be formed integral with the conveyor piece 2. It is preferable that the height of the partition is approximately the same as that of the side protect fins 6. As shown in FIGS. 14, 27 and 28, inserting a member 18' of the same material as that of the fitting portion of the partition's base portion into the recess 19 can make the flat surface of the conveyor piece 2 smoother.

Reference numeral "21" denotes a guide rail assembly, which has a recessed rail $21_1$ for receiving the projections 4 provided at the bottom of the conveyor pieces 2 and a rail edge $21_2$ engageable with the engaging slide members 41 of the links 3. Particularly, at the lower side, i.e., return side of the endless conveyor 1, the engaging slide members 41 are suspended from the rail edge $21_2$.

A specific use of the above embodiment will be described below.

First, after the end portions of each conveyor piece 2 in the side width direction corresponding to the running direction of the endless conveyor 1 are positioned against the walls 30 of the links 3 for positioning alignment, the links 3 are secured to the bottom of the conveyor pieces 2 by means of the bolts 33 or by a fit-in system using the engaging claws 2 and engage receiving portions 31.

Then, the concave face $2_1$ at the free end of the conveyor piece 2 is placed over and fitted with the convex face at the rear portion of the preceding conveyor piece, and the convex face $2_2$ of that conveyor pieces is placed over and fitted with the concave face at the front end of the following conveyor piece.

The recess portion $5_1$ of the front end link portion 5 of each link 3 is engaged with the projecting portion at the rear end of the preceding link, and they are connected together by inserting the shaft 13 in the hole 5' of each link portion. Likewise, the projecting portion $5_2$ at the link's rear end is fitted in and coupled to the recess portion of the following link 3 by the shaft 13.

A plurality of conveyor pieces 2 linked in a belt shape are placed around a pair of sprockets 11 and 12 separated at a given interval from each other, and the projections 4 formed integral on the bottom of the links 3 are engaged with the teeth $11_1$, $11_2$, $11_n$ of both sprockets to connect the conveyor pieces in an endless manner, thereby constituting the endless conveyor 1.

Figure 29:
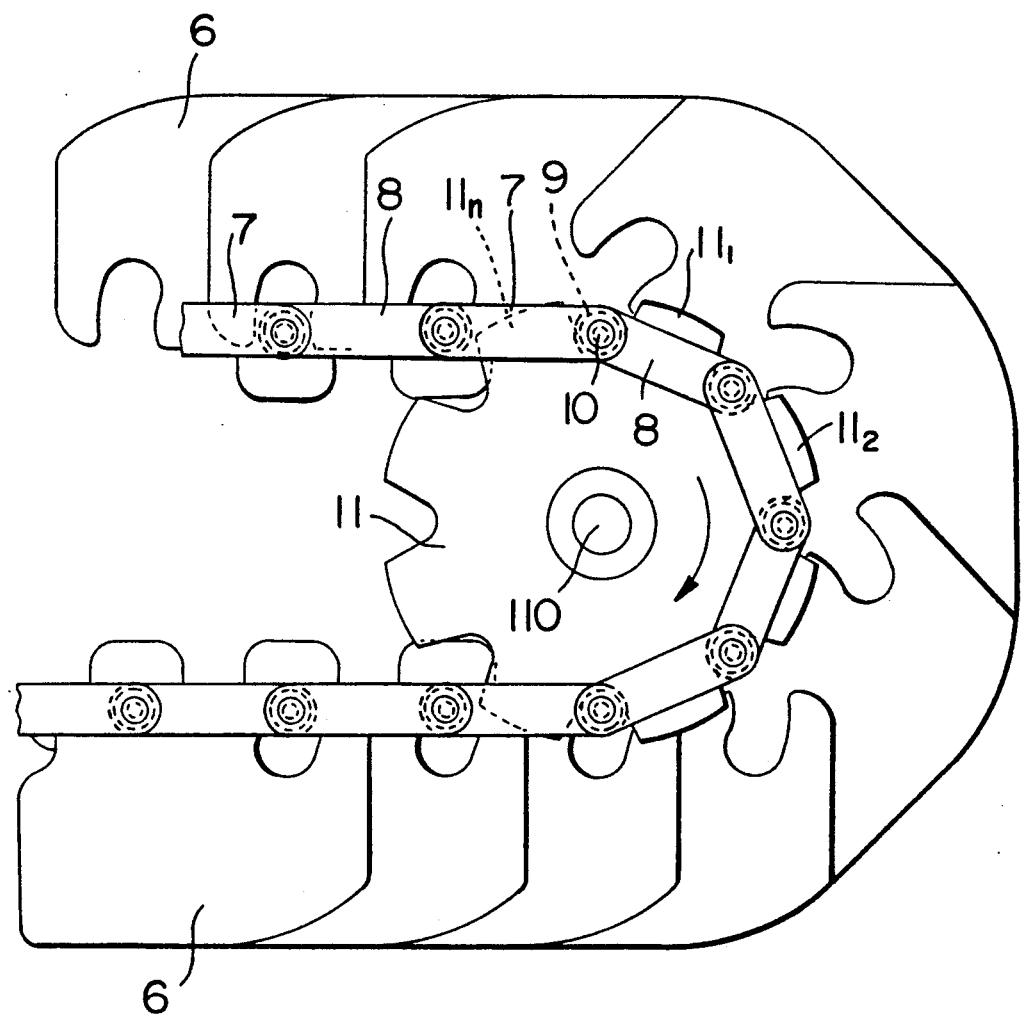
FIG. 29 is a view like that of FIG. 22, illustrating a chain of the conveyor in engagement with a sprocket.

The endless conveyor can be driven by hooking the projections 4 onto the sprockets 11 and 12 or, as shown in FIG. 29, by putting the chains 7 around the sprockets.

Then, with the side protect fins 6 placed against the outer surfaces of the links 3, the protruding portions 61 are fitted in the recess portions $14_1$ of the attaching portions 14, then secured there by means of the bolts 20. The adjoining side protect fins attached together partially overlap one on another with a slightly wide inclination to the rear portion in the running direction.

As a result, powdery goods, fluid goods or the like placed on the loading surface of the endless conveyor 1 do not drop from or fall off the loading surface due to the adjoining conveyor pieces overlapping without seams.

As the convex faces 15 and 15' and the concave faces 16 and 16', formed at the front and rear portions of each link 3 and each side protect fin 6, are connected to those of the adjoining link 3 and side protect fin 6, so that the gaps between the loading surface of the endless conveyor and the flat portions of the side protect fins being can be sealed.

Further, both end faces of the conveyor pieces in the side width direction are tightly coupled without gaps by the side protect fins, so that conveyed goods, such as powdery goods or fluid goods, are conveyed without falling off the sides.

When the operation of the endless conveyor is started by driving the drive motor, the conveyed goods, such as powdery goods are fluid goods, placed on the loading surface of the endless conveyor are prevented from falling off due to the adjoining conveyor pieces 2 overlapping one on another without gaps. The adjoining conveyor pieces are connected together without gaps and are not separated from one another against the tension acting therebetween by the connection between the link portions 5 of the adjoining links 3.

When the projections 4 at the bottom of the conveyor pieces 2 come in engagement with the teeth of the sprockets, the concave and convex faces $2_1$ and $2_2$ at the front and rear of each conveyor piece engage with the convex and concave faces of the adjoining conveyor pieces and move sliding in a circular motion as shown in FIGS. 1 and 21.

In this state, the shaft members 10' provided at the outer surfaces of the links 3 hit the limit switch S switches between the activation and deactivation of the motor, thus allowing the endless conveyor 1 to run and stop at given intervals.

During the running of the endless conveyor 1, the side protect fins 6 attached to both side faces of the conveyor pieces 2 in the side width direction run straight or in a circular motion at the sprocket portions without gaps and without separating from one another, by the connection of the convex face 15 and concave face 16 adjoining in the running direction to the concave face 16' and convex face 15' of the adjoining side protect fins 16 and by about half of a portion of each side protect fin overlapping the adjoining side protect fin in an inclined manner.

With the above arrangement, the present invention produces the following effects.

Further, according to the conveyor system of the present invention, an endless conveyor, put around a pair of sprockets provided at front and end portions of a guide rail assembly and having a loading surface for conveyed goods, comprises conveyor pieces, links and projections engageable with the sprockets, each of the conveyor pieces has concave and convex faces at front and rear end portions in a running direction thereof, the links are attached to the bottom of the conveyor pieces and each has link portions provided at the front and rear in the forward running direction thereof and a projection provided at a bottom to be engageable with the sprockets, the conveyor pieces are placed one on another so that the concave and convex faces of each of the conveyor pieces are engageable with the convex and concave faces of adjoining conveyor pieces. Accordingly, even powdery goods or fluid goods as conveyed goods can be conveyed without falling down from the loading surface.

Further, according to the conveyor system of the present invention, the links are attached to end portions of the conveyor pieces in a side width direction thereof and side protect fins are provided on outer surfaces of the links, separate therefrom or integral therewith, and inclined in such a manner as to be open toward the rear portion of the forward running direction. It is therefore possible to surely prevent conveyed goods from falling from the loading surface as well as falling off the sides of the loading surface. This can ensure conveyance of conveyed goods even if they are powdery goods or fluid goods.

Further, according to the conveyor system of the present invention, the link portions of the links each has a projecting portion formed at one end and a recess portion formed at the other end, the projecting portion of each of the link portions is fitted to the recess portion of the link portion of an adjoining one of the links while the recess portion is fitted to the projecting portion of the link portion of another adjoining one of the links, and the link portions are rotatable by means of coupling shafts. The endless conveyor gets to fit the sprockets and can make smooth circular running.

Further, according to the conveyor system of the present invention, each link has a side protect fin attaching portion provided on an outer end face and convex and concave faces respectively formed at front and rear of the side protect fin attaching portion in such a way that when the links are connected to one another, the convex face engages with the concave face of an adjoining one of the side protect fin attaching portions and the concave face engages with the convex face of another adjoining one of the side protect fin attaching portions. The connecting portion between the flat surface of each conveyor piece and the base portion of the associated side protect fin can therefore be completely sealed, thus making it surer to prevent powdery goods or fluid goods from falling off.

Further, according to the conveyor system of the present invention, an engaging slide member provided on the link side prevents slack on the lower, returning side of the endless conveyor. This eliminates the need of large tension to put the conveyor pieces around the sprockets and link them to be an endless conveyor, thus increasing the assembling accuracy and facilitating the assembling work.

Further, according to the conveyor system of the present invention, the links are attached to right and left end portions of the conveyor pieces, side protect fins are provided on outer end faces of the links, separate therefrom or integral therewith, and inclined in such a manner as to be open toward the rear portion of the forward running direction. It is therefore possible to surely prevent conveyed goods from falling from the loading surface as well as falling off the sides of the loading surface. This can ensure conveyance of conveyed goods even if they are powdery goods or fluid goods.

Further, since that face of each of the side protect fins which faces a head of a coupling shaft to be fitted in a hole of an associated one of the link portions of the links is made a blind patch without a through hole of the coupling shaft, coming-off of the shaft head is restricted by the adjoining side protect fins without any drive-out preventing clip fitted over the tip of the coupling shaft. This eliminates the need for such a clip, thus significantly shortening the assembling time and improving the assembling efficiency.

Further, according to the conveyor system of the present invention, auxiliary links are disposed between side ends of the endless conveyor and have engage receiving portions engaged with engage claws of the conveyor pieces, auxiliary link receiving members are provided on a support member of the guide rail assembly, and both sides of the auxiliary links are positioned to be stationary by interval holding members. Even when the width of the endless conveyor is made wider and heavy goods are placed thereon, it is possible to surely prevent the endless conveyor from bending downward due to the load pressure. Further, since the auxiliary links are easily and surely positioned, they do not come off the engage receiving portions.

Further, according to the conveyor system of the present invention, a longitudinal recess is formed in an inner surface of each of the side protect fins and a partition having a side portion which can be fitted in the recess is formed on each of the conveyor pieces. Even if the width-directional end faces of the conveyor piece and the end faces of the partition are constructed to be the same, the gaps between these end faces and the side protect fins can surely be sealed, thus surely preventing even powdery goods or fluid goods from falling off from the gaps.

Further, according to the conveyor system of the present invention, an engaging slide member is a roller attached to a shaft of each of the links. This arrangement reduces the friction, thus making the sliding at the rail edge after engagement smoother and reducing the load applied to the drive motor which eliminates another possible cause of malfunction.

Further, according to the conveyor system of the present invention, a projection is formed at one of the front and rear of each of the link portions, and a tie recess is formed at the other side. This eliminates the need to use a coupling shaft to connect the links, thus reducing the total number of necessary parts.

Further, according to the conveyor system of the present invention, providing a buffer made of a flexible material on a flat face of each conveyor piece can prevent conveyed goods from being damaged, thus keeping the quality of the goods.

Further, according to the conveyor system of the present invention, a partition is formed on a flat face of each of the conveyor pieces integrally or separately and stands upright in a recess shape. This partition can divide the loading surface of the endless conveyor into sections with arbitrary lengths in the running direction, so that even when the conveyor system is sited, inclined upward or downward, loaded conveyed goods can surely be conveyed without being shifted.

Further, according to the conveyor system of the present invention, shaft members are protrusively provided at predetermined intervals on outer surfaces of the links and a limit switch is provided on a side of the guide rail that supports the front and rear sprockets, whereby when the shaft members reach the limit switch, an ON/OFF switching action of the limit switch is conducted. The endless conveyor can therefore run accurately at given pitches to surely transfer conveyed goods.

Further, according to the conveyor system of the present invention, a sprocket engage chain comprising a link piece, a bush and a coupling shaft is provided along and on each of the links. Stronger drive force can be applied by the engagement of the chains with the sprockets through the motor driving in addition to the engagement of the projections with the sprockets.

What is claimed is:
1. A conveyor system comprising:
   an endless conveyor;
   a pair of sprockets, said endless conveyor extending around said pair of sprockets provided;

a guide rail assembly comprising at least one guide rail, said assembly having a front portion and an end portion, said pair of sprockets being respectively positioned at said front portion and said end portion of said guide rail assembly;

said endless conveyor having a loading surface for conveyed goods and further comprising:
a plurality of conveyor pieces;
links extending along said guide rail; and
projections engageable with said sprockets;

each of said conveyor pieces having concave and convex faces at front and rear end portions in a running direction of said endless conveyor, each of said conveyor pieces further having opposite lateral end faces, said links being disposed under said conveyor pieces and having position aligning walls adapted to abut on said opposite lateral end faces of said conveyor pieces for attachment to said conveyor pieces, and each of said links having link portions provided at a front and rear in a running direction of said link portions and a projection provided at a bottom for engagement with said sprockets, said conveyor pieces being placed one on another so that said concave and convex faces of each of said conveyor pieces are engageable with said convex and concave faces of adjoining conveyor pieces.

2. The conveyor system according to claim 1, wherein said links are attached to opposite lateral end portions of said conveyor pieces, said links having outer end surfaces, said conveyor system further comprising side protect fins provided on said outer surfaces of said links, inclined in such a manner as to be open toward one end portion of a running direction.

3. The conveyor system according to claim 1 wherein said link portions of said links each have a projecting portion formed at one end a recess portion formed at the other end, said projecting portion of each of said link portions is fitted to said recess portion of said link portion of an adjoining one of said links while said recess portion is fitted to said projecting portion of said link portion of another adjoining one of said links, and said link portions are rotatable by means of coupling shafts.

4. The conveyor system according to claim 1, wherein said links have outer end faces and said links each have a side protect fin attaching portion provided on each said outer end face, each of said side protect fins having a front and rear and, further, having convex and concave faces respectively formed at said front and rear of said side protect fin attaching portion in such a way that when said links are connected to one another, said convex face of each side protect fin engages with a respective concave face of an adjoining one of said side protect fin attaching portions and said concave face of each side protect fin engaging with said convex face of another adjoining one of said protect fin attaching portions.

5. The conveyor system according to claim 1 wherein an engaging slide member is provided on a side of said sprocket engaging projection of each of said links and a rail edge is formed on said guide rail assembly for engagement with said engaging slide member.

6. The conveyor system according to claim 1, wherein said links are attached to opposite lateral end portions of said conveyor pieces, side protect fins are provided on outer ends faces of said links, inclined in such a manner as to be open toward one end portion, in a running direction of said conveyor, each of said links has opposite outer end portions and each of said side protect fins has a surface which faces a respective outer end portion of one of said links and at least one hole extending through said side protect fin, said conveyor system further including a coupling shaft for each of said holes in said side protect fin, each said coupling shaft extending through said hole and into a further hole of an associated one of said link portions of said links, each said coupling shaft further having a head positioned on an outer surface of a respective one of said side protect fins, and wherein a portion of an adjacent side protect fin having a portion constituting a blind covering without a through hole for said coupling shaft.

7. The conveyor system according to claim 1, further comprising auxiliary links disposed between opposite sides of said endless conveyor, said conveyor pieces further comprising engage claws, said auxiliary links having engage receiving portions engaged with said engage claws of said conveyor pieces, said guide rail assembly further comprising a support member, and an auxiliary link receiving member provided on said support member of said guide rail assembly, and said auxiliary links having a pair of sides, said conveyor system further comprising a pair of interval holding members extending along the conveyor at a position for guiding both of said pair of sides of said auxiliary links to thereby maintain said auxiliary links along a predetermined path.

8. The conveyor system according to claim 2, wherein a longitudinal recess is formed in an inner surface of each of said side protect fins and a partition having a side portion fittable in said recess is formed on each of said conveyor pieces.

9. The conveyor system according to claim 1 wherein an engaging slide member is a roller attached to a shaft of each of said links.

10. The conveyor system according to claim 1, wherein a projection is formed at one of the front and rear of each of said link portions, and a tie recess is formed at the other of the front and rear of each of said link portions.

11. The conveyor system according to claim 1, wherein a buffer made of a flexible material is provided on a flat face of each of said conveyor pieces.

12. The conveyor system according to claim 1, wherein a recess is formed in a flat face of each of said conveyor pieces and a partition is formed on a flat face of each of said conveyor pieces and stands upright in said recess.

13. The conveyor system according to claim 1, wherein shaft members are provided at predetermined intervals on outer surfaces of said links and a limit switch is provided on a side of said guide rail, whereby when said shaft members reach said limit switch, an ON/OFF switching action of said limit switch is conducted.

14. The conveyor system according to claim 1, wherein a sprocket engage chain comprising a link piece, a bush and a coupling shaft is provided along and on each of said links.

15. The conveyor system according to claim 2, wherein said side protect fins are separate from said links.

16. The conveyor system according to claim 2, wherein said side protect fins are unitary with said links.

17. The conveyor system according to claim 6, wherein said side protect fins are separate from said links.

18. The conveyor system according to claim 6, wherein said side protect fins are unitary with said links.

19. The conveyor system according to claim 12, wherein said partitions are separate from said conveyor pieces.

20. The conveyor system according to claim 12, wherein said partitions are unitary with said conveyor pieces.

21. A conveyor section for use in an endless conveyor system comprised of a plurality of said conveyor sections, said conveyor section comprising:
- a conveyor piece having concave and convex surfaces, at front and rear portions, and laterally opposite end surfaces, with respect to a direction of movement of the conveyor system, said concave and convex surfaces being adapted to be engageable with respective concave and convex surfaces of adjoining conveyor pieces to be adapted to thereby form an endless series of conveyor sections;
- a plurality of laterally positioned links, each of said links comprising:
  - at least one portion for engagement with a guide rail of the endless conveyor system;
  - a projection for engagement with sprockets of the conveyor system; and
  - a position aligning wall;
- said conveyor piece being secured upon said plurality of laterally positioned links, and said position aligning wall of each of said laterally positioned links engaging one of said end surfaces of said conveyor piece.

22. The conveyor section of claim 21, further comprising:
- at least one auxiliary link positioned between said laterally positioned links, said at least one auxiliary link being secured to said conveyor piece and further having a portion for sliding upon a slide receiving member of the conveyor system.

23. The conveyor section of claim 22, wherein:
said conveyor piece comprises a plurality of engage claws and at least one of said laterally positioned links and said auxiliary links comprise engage receiving portions, wherein said conveyor piece is secured upon said links, having said engage receiving portions, by means of said engage claws being received within said engage receiving portions.

24. An endless conveyor system comprising:
a plurality of conveyor sections connected together, each of said conveyor sections comprising:
- a conveyor piece having concave and convex surfaces, at front and rear portions, and laterally opposite end surfaces, with respect to a direction of movement of the conveyor system, said concave and convex surfaces being engaged with respective concave and convex surfaces of adjoining conveyor pieces to form an endless series of connected conveyor sections;
- a plurality of laterally positioned links, each of said links comprising:
  - at least one portion for engagement with a guide rail of the endless conveyor system;
  - a projection for engagement with sprockets of the conveyor system; and
  - a position aligning wall;
- said conveyor piece being secured upon said plurality of laterally positioned links, and said position aligning wall of each of said laterally positioned links engaging one of said end surfaces of said conveyor piece.

25. The endless conveyor system of claim 24, further comprising:
for each of said conveyor pieces, at least one auxiliary link positioned between said laterally positioned links, said at least one auxiliary link being secured to said conveyor piece and further having a portion for sliding upon a slide receiving member of the conveyor system.

26. The endless conveyor system of claim 25, wherein:
each of said conveyor pieces comprises a plurality of engage claws and at least one of said laterally positioned links and said auxiliary links comprises engage receiving portions, wherein said conveyor piece is secured upon said links, having said engage receiving portions, by means of said engage claws being received within said engage receiving portions.

* * * * *